Sept. 4, 1962  A. W. GUSTAFSON ETAL  3,052,077
LINE MARKING MACHINE
Filed Sept. 12, 1958  5 Sheets-Sheet 2

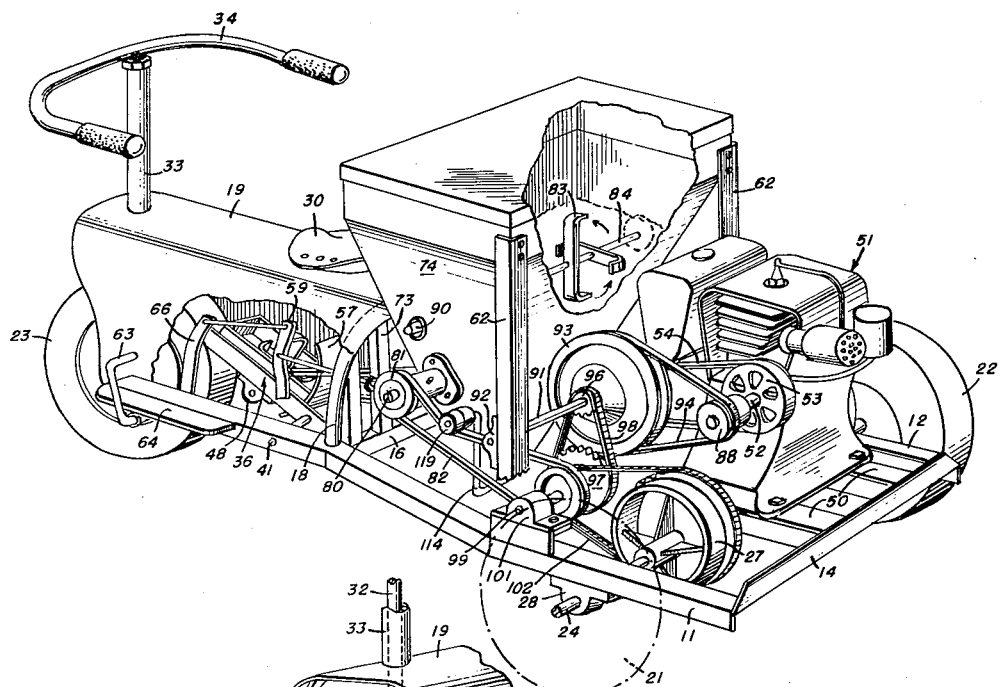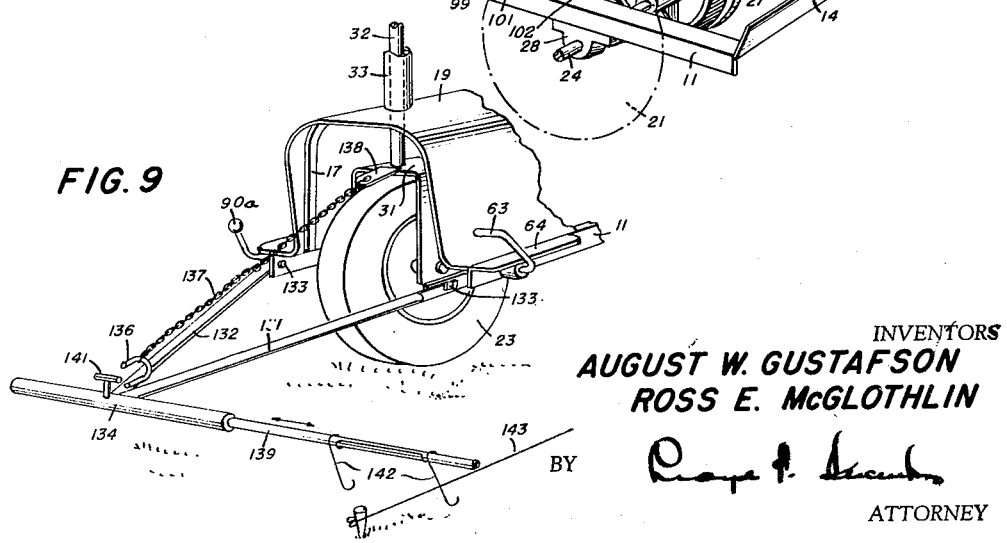

INVENTORS
AUGUST W. GUSTAFSON
ROSS E. McGLOTHLIN

BY

ATTORNEY

Sept. 4, 1962  A. W. GUSTAFSON ETAL  3,052,077
LINE MARKING MACHINE

Filed Sept. 12, 1958  5 Sheets-Sheet 3

INVENTORS
AUGUST W. GUSTAFSON
ROSS E. McGLOTHLIN
BY
ATTORNEY

Sept. 4, 1962 A. W. GUSTAFSON ETAL 3,052,077
LINE MARKING MACHINE
Filed Sept. 12, 1958 5 Sheets-Sheet 4

INVENTORS
*AUGUST W. GUSTAFSON*
*ROSS E. McGLOTHLIN*

BY
ATTORNEY

Sept. 4, 1962  A. W. GUSTAFSON ETAL  3,052,077
LINE MARKING MACHINE

Filed Sept. 12, 1958  5 Sheets-Sheet 5

INVENTORS
**AUGUST W. GUSTAFSON
ROSS E. McGLOTHLIN**

BY

ATTORNEY

United States Patent Office 3,052,077
Patented Sept. 4, 1962

3,052,077
LINE MARKING MACHINE
August W. Gustafson, Corpus Christi, and Ross E. McGlothlin, Sinton, Tex.; said McGlothlin assignor to said Gustafson
Filed Sept. 12, 1958, Ser. No. 760,727
3 Claims. (Cl. 56—25.4)

The present invention relates to a power propelled vehicle or machine carrying power driven means for cutting the grass of an athletic field or the like in a narrow strip and for applying marking material to the strip providing boundary lines and other lines marking an athletic field or the like.

In the past it has been necessary in providing the lines on an athletic field such as one on which football is to be played to cut the turf along narrow strips and to then apply marking material to the strips and when these operations are carried out manually as many as seventeen man hours have been required to cut the grass and apply marking material to the strips to provide all of the lines that are necessary for a football field.

It is an object of the present invention to provide a machine which is power propelled and adapted to cut the grass in a narrow strip and the machine includes means for delivering marking material to the strips where the grass has been cut to provide the necessary line markings on an athletic field.

Another object of the invention is to provide means on such a machine for first cutting the grass and cleaning a narrow strip in the turf and immediately thereafter applying the marking material and to provide means on such a machine wherein the cutting mechanism may be rendered inoperative when it is desired to apply the line marking material to existing strips where the grass has been cut and to provide means on the vehicle for rendering the cutting mechanism operable while the line marking mechanism remains inactive.

Another object of the invention is to provide means promoting the discharge of the marking material from a hopper when the discharge chute therefor is lowered to a line marking position and to arrest movement of such means when the chute is lifted to terminate a line marking operation.

Other objects and features of the invention will be appreciated and become apparent as the present disclosure proceeds and upon consideration of the following detailed description and the accompanying drawings wherein several embodiments of the invention are disclosed.

In the drawings:

FIG. 1 is a perspective view of a machine exhibiting the invention with portions broken away and other parts omitted to illustrate the general organization of the apparatus.

FIG. 9 is a perspective view of the forward end portion of the machine illustrating a guide attachment for the vehicle in an operative position.

Figure 2:
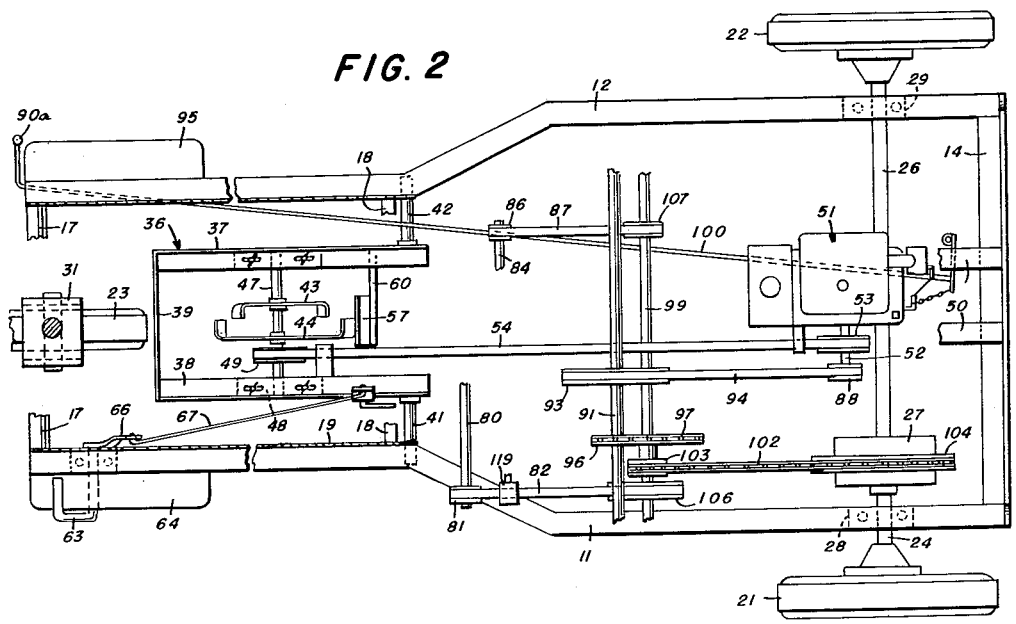
FIG. 2 is a plan view of the vehicle chassis and the cutter mechanism with parts omitted to illustrate the manner in which power is transmitted to parts of the machine.

Referring to the drawings there is shown particularly in FIGS. 1 and 2 a chassis frame which includes longitudinal members 11 and 12. The rear ends of these longitudinal members are joined by a transverse member 14. The longitudinally extending frame members are joined intermediate the ends thereof by a transverse member 16 as shown in FIG. 1. A plurality of arched transverse members 17 and 18 join the forward portions of the longitudinally extending frame members 11 and 12. A housing 19 of an arched construction is carried by the forward portion of the frame and extends upwardly from one longitudinally extending frame member 11 to the other longitudinally extending frame member 12. The housing 19 is supported on the arched members 17 and 18.

The chassis frame is supported for rolling movement by rear wheels 21 and 22 and a front wheel 23. The rear wheels 21 and 22 are power driven as hereinafter described through two axially aligned shafts 24 and 26 which receive power through a differential gear box 27. The shafts 24 and 26 are journalled for rotation in bearings 28 and 29 connected respectively to the longitudinally extending frame members 11 and 12. The front wheel 23 is provided for steering the machine or vehicle and it is mounted in a fork 31. A vertical shaft 32 connected to the fork 31 extends through a sleeve 33 carried by the arched transverse frame member 17. The shaft 32 is connected to handle bars 34 which are adapted for manipulation by an operator supported on a seat 30 carried by a bracket 35 attached to the arched frame member 18. The housing 19 is open at the forward end as shown in FIG. 9 and open at the bottom along the length thereof and is of such dimensions as to permit the wheel 23 to be turned so that the shaft 32 may be rotated throughout one hundred and eighty degrees to provide for manipulation of the machine.

Figure 4:
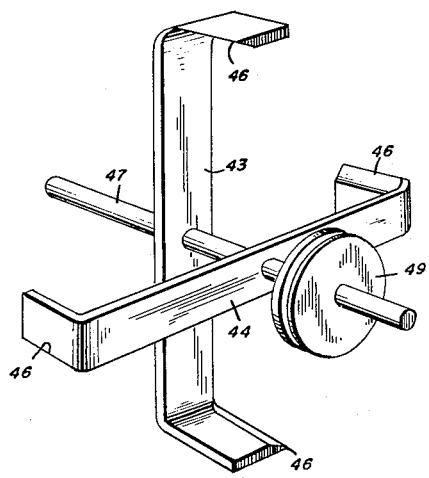
FIG. 4 is a perspective view of the cutting elements or knives.

The machine includes means for cutting grass in a narrow strip as the vehicle moves forwardly. The cutting means includes a cutter frame 36 which is formed of two parallel and laterally spaced bars 37 and 38 which are joined at the forward end by a transverse element 39. The cutter frame is mounted for swinging movements about a horizontal axis and a pivotal support for the cutter frame includes a stub shaft 41 carried by the longitudinal frame member 11 and a stub shaft 42 carried by the longitudinal frame member 12. The stub shafts 41 and 42 are in axial alignment. The rear ends of the bars 37 and 38 are pivotal on the inner confronting ends of the stub shafts 41 and 42. The housing 19 is of such dimensions as to accommodate the cutter frame 36 in the raised and inactive position as shown in FIG. 1. The cutting mechanism includes a pair of U-shaped cutter elements or blades 43 and 44 which are best shown in FIG. 4. These cutter elements have sharp edges as indicated at 46. The cutter elements are secured to a shaft 47 which is journalled for rotation in bearings 48 carried by the longitudinally extending bars 37 and 38. The bearings 48 are adapted to be shifted longitudinally of the bars 37 and 38 of the cutter frame by slotted accommodation of the mounting bolts as shown in FIG. 2.

An engine 51 is mounted on the rear portion of the frame and on auxiliary frame members 50 as shown in FIG. 1 and the output shaft 52 of the prime mover carries a pulley 53. A belt 54 is trained about the pulley 53 and a pulley 49 on the shaft 47 of the cutting mechanism. The sharp edges 46 of the cutter elements are of such dimensions as to cut grass in a narrow strip as indicated at 56 in FIG. 5 and of a width which is customarily employed for marking an athletic field or the like. An arcuate shield 57 (FIGS. 2 and 6) is rigidly mounted on the cutter frame 36 by means of a bracket 60. The shield 57 preferably has a transverse dimension slightly greater than the lateral extremities of the cutting elements 43 and 44. The shield 57 is for the purpose of preventing the grass which is cut by the blades from being thrown rearwardly. The housing 19 also serves as a shield extending over an upper portion of the path of movement of the cutting elements.

The cutter frame 36 is releasably retained in the inactive position within the housing 19 (FIG. 1) by means of an arm 59 rigidly attached to the cutter frame and by resilient means in the form of springs 61 (FIG. 6) attached to the upper end of the arm 59 and to an upright frame member 62. The inactive position of the cutter frame 36 is shown in dotted lines in FIG. 6 and the spring means 61 has sufficient energy stored therein to maintain the cutter frame in the inoperative position within the housing 19. The cutter frame 36 turns about the axis of the stub shafts 41 and 42 and in the inactive position the belt 54 is not tensioned so that operation of the engine 51 will not cause rotation of the pulley 49 and the cutter blades remain at rest.

Figure 3:
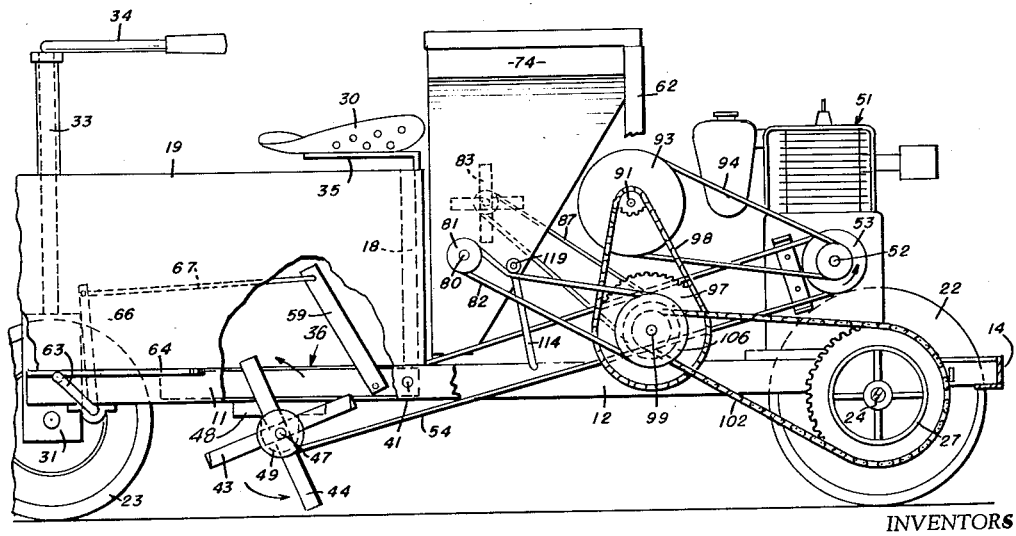
FIG. 3 is a side elevational view partly in section and with portions broken away and with other parts omitted illustrating the cutting mechanism in the active position.
Figure 5:
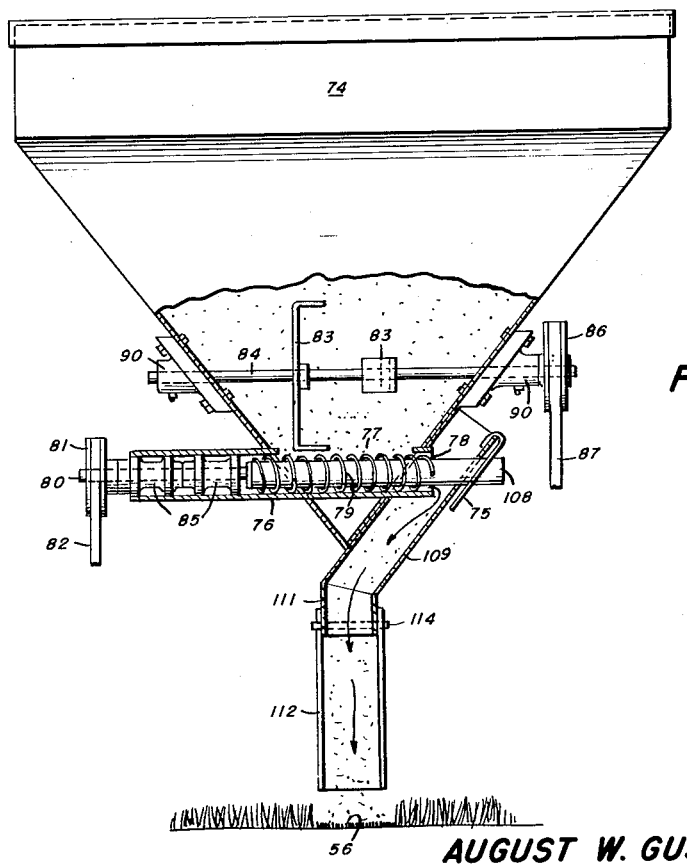
FIG. 5 is a rear elevational view of one hopper with portions of the dispensing mechanism illustrated in section and showing the manner in which pulverulent marking material is delivered to provide a line on an athletic field.
Figure 6:
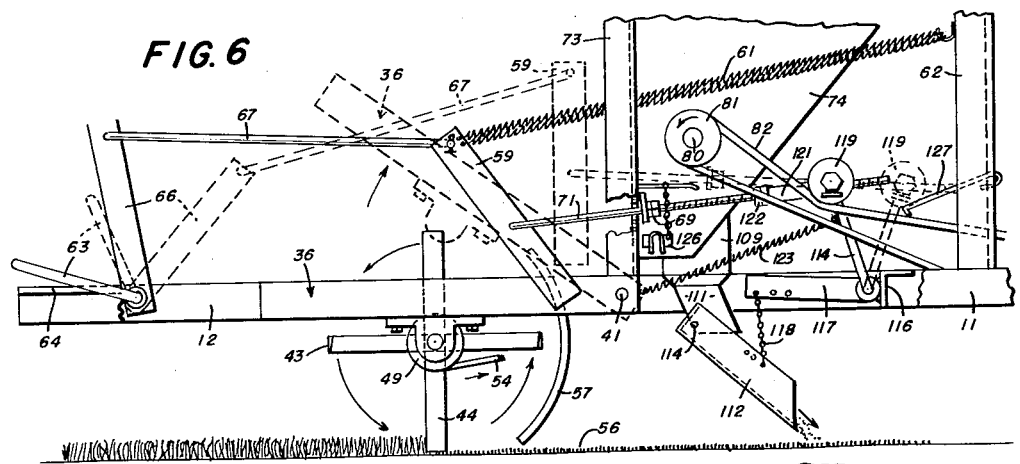
FIG. 6 is a fragmentary side elevational view of a portion of the machine illustrating the cutter mechanism in an active position and the other parts in position to deliver pulverulent marking material to a strip in the turf where the grass has been cut.

The cutter frame is moved to the active position shown in FIG. 3 and in full lines in FIG. 6 by means of a pedal 63 mounted adjacent the forward end of the frame for actuation by the left foot of an operator supported on the seat 30. The pedal 63 is adjacent a pad 64 carried by the frame member 11. When the pedal 63 is depressed an arm 66 connected to the pedal is moved in a counter-clockwise direction and a rod 67 attached to the upper end of the arm 66 and to the upper end of the arm 59 exerts tension on the spring means 61 so as to cause the arm 59 to move from the dotted line position of FIG. 6 to the full line position so that the cutter frame 36 swings downwardly about the axis of the stub shafts 41 and 42. Downward swinging movement of the cutter frame is arrested by a nut 69 carried by a threaded rod 71 attached to the arm 59. The nut 69 is adapted to engage an upright frame member 73 and limit the downward swinging movement and the cutter frame so that the cutting edges of the blades follow a path immediately above and closely adjacent the surface of the ground to sever the grass and provide a cut strip in the turf as indicated at 56 in FIG. 5. Such downward swinging of the cutter frame causes the belt 54 to be tensioned about the pulleys 49 and 53. In the lowered position the shaft 47 is so positioned that a straight line through the axis of the shaft 47 and the axis of the shaft 52 is slightly below the axis of the stub shafts 41 and 42. Such an arrangement avoids the possibility of the belt lifting the cutter frame from the active position while power is transmitted to the shaft 47.

In one embodiment of the apparatus means is provided for distributing pulverulent marking material to the ground in a narrow pattern within the strip from which the grass has been cut. A hopper 74 is provided on the frame and supported by the upright members 62. The hopper at its upper end may be of rectangular shape and the side walls at the rear portion and at the sides converge inwardly in proceeding downwardly so as to guide the pulverulent marking material into an auger barrel 76 arranged transversely of the lower end of the hopper as shown in FIG. 5. The auger barrel has an upward facing opening 77 and the barrel is open at one end as indicated at 78. An auger 79 is arranged for rotation within the auger barrel 76 and is driven by a pulley 81 mounted on a shaft 80. The shaft 80 is supported for rotation by bearings 85 secured within the barrel 76. An agitator is provided within the hopper 74 and it includes agitating elements 83 attached to a shaft 84 which is journalled in bearings 90 mounted on the sloping side walls of the hopper 74. A pulley 86 secured to the shaft 84 is driven by a belt 87.

The output shaft 52 of the engine 51 is provided with a centrifugal clutch embodied in a pulley 88 which is engaged when the speed of the engine is increased above the idling speed so that the pulley 88 is then driven by the shaft 52. A pedal 90a (FIG. 2) adjacent a pad 95 actuates a linkage 100 for increasing the speed of the engine. A shaft 91 is mounted in bearings 92 (FIG. 1) carried by the upright frame members 62 and a pulley 93 is mounted on the shaft 91. A belt 94 is trained about the pulleys 88 and 93 to drive the shft 91 when the engine has attained a predetermined speed and upon engagement of the clutch. A sprocket wheel 96 on the shaft 91 drives another sprocket wheel 97 on a shaft 99 by means of a chain 98. The shaft 99 is mounted in bearings 101 for rotation (FIG. 1) carried by the longitudinal frame members 11 and 12. A chain 102 is trained about a sprocket wheel 103 on the shaft 99 and about a sprocket 104 on the differential gear casing 27. When the speed of the engine is increased sufficiently the centrifugal clutch is engaged to drive the shaft 99 to impart rotation to the differential gear casing to rotate the driving shafts 24 and 26 so that the machine is power driven.

A pulley 106 on the shaft 99 about which the belt 82 is trained serves to drive the pulley 81 and the auger 79 in the hopper 74 when the belt 82 is tensioned as hereinafter described. A pulley 107 (FIG. 2) on the shaft 99 drives the pulley 86 by means of the belt 87 to actuate the agitator shaft 84. A plug 108 is provided in the auger barrel 76 to prevent free discharge of the pulverulent marking material. This plug 108 extends into the hollow helical auger 79 so that the pulverulent material is only delivered from the hopper 74 through the open end 78 of the auger barrel when the shaft 80 and the auger 79 are rotated. A conduit 109 is provided at the open end of the auger barrel into which the powdered or pulverulent material is delivered. The conduit 109 is supported on the hopper 74 and a pin 75 carried by this conduit extends through the plug 108 and prevent rotation thereof. The pulverulent material slides downwardly into a conduit fitting 111. A chute 112 is pivotally attached by means of a pin 114 to the lower end of the conduit fitting 111. The chute 112 has a width substantially equal to the strip to be marked as shown in FIG. 5. The chute 112 is mounted directly behind the cutter blades 43 and 44. The side walls of the chute 112 serve as wind breaks and when the chute 112 is in the lowered position shown in FIGS. 5 and 6 the pulverulent material is distributed close to the ground and thereby preventing drifting as a consequence of air currents.

Figure 8:
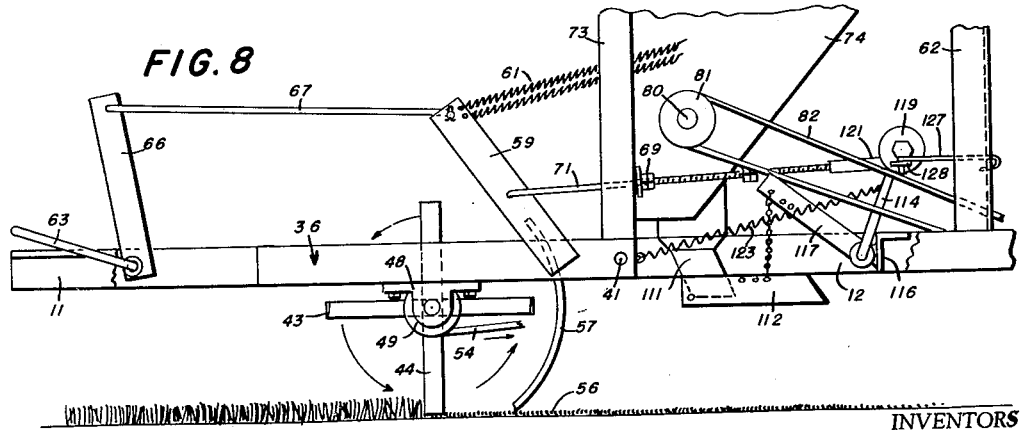
FIG. 8 is a similar view showing the cutting mechanism in an active operative position with the elements for dispensing the marking material in an inactive position.

The chute 112 is shown in an active position in FIGS. 5 and 6 but is retained in an inactive position until initiation of the line marking operation. An idler arm 114 is mounted for swinging movements about a horizontal axis on the chassis frame and on a transverse member 116 as shown in FIG. 6. Another arm 117 is connected to the idler arm 114 so as to swing therewith. A chain or other non-elastic flexible element 118 connects the free end of the arm 117 with the chute 112. A plurality of holes are provided in the chute and in the arm 117 so that the chain 118 may be connected at spaced points to each of these elements. When the arm 114 and the idler arm 117 are swung to the position shown in FIG. 8 the chute 112 is hinged to the inactive position so as to avoid any downward slope thereof and to prevent the escape of any pulverulent material therefrom.

A pulley 119 is carried by the upper free end of the idler arm 114. The bearing for the idler pulley 119 (not shown) is secured to a sleeve 121 which is slidable on the threaded rod 71. The belt 82 for driving the auger 79 is of such length that when the idler pulley 119 is in the retracted position (FIG. 8) there is no transmission of power to the pulley 81 and the auger remains at rest. Abutment means in the form of two lockable nuts 122 are threaded on the rod 71 and may be arranged in different positions along the length thereof and secured in any fixed position thereon. A spring 123 attached at one end to the chassis frame and at the other end to the idler arm 114 tends to urge the idler pulley 119 into a position to tighten the belt 82 and to lower the arm 117 and the chute 112.

In operation and when it is desired to cut a narrow path or strip in the grass of an athletic field or the like the pedal 63 is depressed to the full line position shown in FIG. 6 to thereby swing the arm 66 forwardly. Such movement of the arm 66 causes the rod 67 to pull the arm 59 against the action of the spring means 61. The cutter frame 36 thus swings downwardly about the axis of the stub shafts 41 and 42 from the dotted line position shown in FIG. 6 to the full line position where the cutting edges 46 of the blades 43 and 44 follow a path quite close to the ground. The belt 54 is tensioned when the cutter frame 36 arrives in an active position and the cutting blades are thus rotated to cut the grass in a narrow strip such as shown at 56 in FIG. 5. During the forward swinging of the arm 59 the rod 71 is shifted forwardly until the stop nut 69 engages the upright frame member 73 which limits the downward swinging of the cutter frame 36 and accordingly prevents the cutting edges 46 of the blades from digging into the soil. The forward movement of the threaded rod 71 shifts the abutment nuts 122 forwardly of the machine and the sleeve 121 slides forwardly with the forward movement of the rod 71 in response to action of the spring 123 and the idler arm 114 is moved forwardly from the dotted line position of FIG. 6 to the full line position. The idler pulley 119 then tensions the belt 82 to drive the auger shaft 80. The arm 117 is lowered so that the chute 112 swings downwardly to permit the pulverulent material to slide downwardly in the chute assembly as it is being delivered through the open end 78 of the auger barrel by operation of the auger. The pulverulent material is thus delivered onto the narrow strip as provided by the cutting blades.

Figure 7:
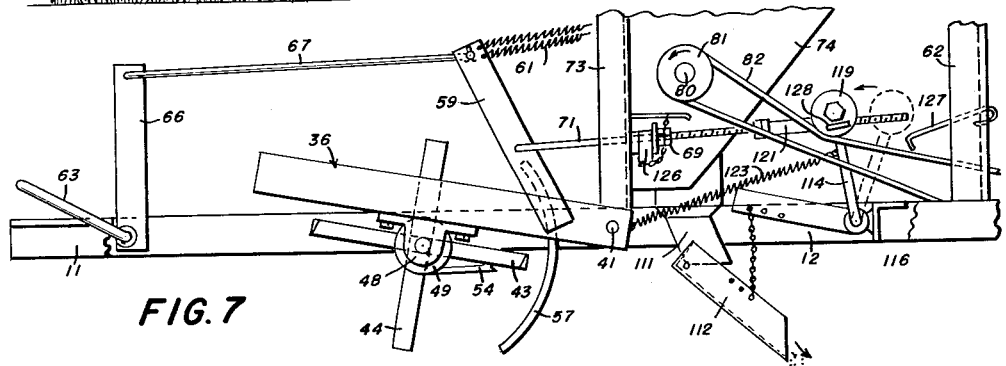
FIG. 7 is a similar view showing the line marking mechanism in an operable position with the cutting mechanism in an intermediate and inactive position.

When it is desired to apply the pulverulent material to an athletic field or the like which has narrow strips previously cut in the turf a clip 126 is arranged over the rod 71 and interposed between the stop nut 69 and the upright frame member 73 as shown in FIG. 7. This prevents the cutter frame 36 from swinging downwardly to a full active position and avoids tension of the belt 54. Thus the cutter blades 43 and 44 are not driven and they remain at rest. The threaded rod 71 is moved forwardly of the machine sufficiently to permit the idler pulley 119 to tension the belt 82 and to lower the chute 112 to an active position. The powdered material is thus discharged from the hopper by operation of the auger 79 and the pulverulent marking material is delivered to the strip which is to be marked.

When it is desired to cut the grass without applying the pulverulent marking material a hook element 127 (FIG. 8) which is attached to the upright frame member 62 is engaged in an eyelet 128 carried by a bearing for the idler pulley 119. This prevents the idler pulley from moving forwardly with forward movement of the threaded rod 71. In such an operating condition use of the clip 126 is avoided so that the abutment nut 69 on the rod 71 may move forwardly to engage the upright frame member 73. The cutter frame is thus lowered to the active position shown in FIG. 8 when the belt 54 is tensioned to drive the cutter elements. The chute 112 remains in the inactive position and since the belt 82 is not tensioned the auger 79 is not set in operation.

The machine may be provided with means at the forward end to facilitate guiding of the machine in carrying out the marking of an athletic field or the like. Such means include two forwardly extending arms 131 and 132 (FIG. 9) which are pivotally connected at 133 to the forward end of the longitudinally extending frame members 11 and 12. The arms 131 and 132 converge towards each other and are joined at the forward ends and connected to a transversely disposed tube 134. A hook 136 is provided at the juncture of the arms 131 and 132 with the tube 134. The arms 131 and 132 are of such length that when they are in the lowered position shown in FIG. 9, the hook 136 serves as a guide index which is longitudinally aligned with the cutting edges 46 of the blades 43 and 44. A chain or similar flexible element 137 extends from the hook 136 to a bracket 138 which is rigidly attached to the fork 31. The chain 137 limits the downward swinging movement of the arms 131 and 132. In the event that the index means is not necessary this frame structure may be hinged about the axis of the pivots 133 and held in a generally vertical position by any suitable means such as by employing the chain 137. A rod 139 is mounted for sliding movement in the tube 134 and may be held in any adjusted positions therein by a thumb screw 141. Flexible feeler arms 142 are carried by the rod 139 which are adapted to cooperate with the guide string or line 143. The line 143 is located parallel to the path to be followed in applying a marked line on the field. Steering the machine so that either of the feeler fingers 142 moves in a path along the line 143 will cause the machine to cut a strip which is parallel to the line 143. At the end of a line cutting or marking operation and when the wheel 23 is turned by the handle bars 34 the fork 31 is turned and the bracket 138 is thus turned with the fork. This pulls the chain 137 so as to elevate the forward end of the arms 131 and 132 which turns about the pivots 133 so that the feelers 142 are elevated and thus free of any guide line such as represented at 143.

The machine is adapted to receive a hopper for liquid when such materials are to be employed for marking an athletic field or the like. The hopper 74 is removed and the belt 82 is removed. A liquid receiving hopper 146 having a shape similar to the hopper 74 is then mounted on the upright frame members 62. A paddle structure 147 is mounted for rotation in the lower portion of the hopper 146 and it is adapted to be rotated by a shaft 148. A pulley 149 is fixed on the shaft 148 and it is adapted to receive the belt 87 which is driven by the pulley 107. The shaft 148 is journalled for rotation by bearings 151 carried by the opposite converging side walls of the hopper 146. A valve 152 is provided at the lower portion of the hopper 146. This valve is actuated by a lever 153 which is closed when in the dotted line position shown in FIG. 10. The lever 153 is actuated by a rod 154 having an adjustable length attached to the free end of the lever 153 and to the free end of the arm 117. A chute 156 is mounted on pivots 157 carried by brackets 158 which depend from the hopper 146. The chain 118 which is connected to the arm 117 serves to raise and lower the chute 156.

Figure 10:
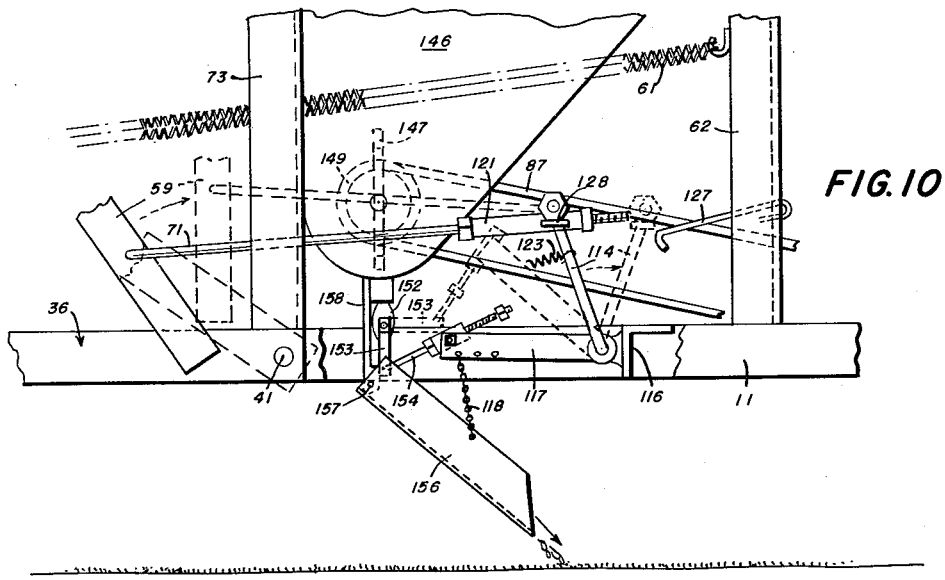
FIG. 10 is a fragmentary side elevational view of a portion of the machine provided with a modified hopper for dispensing a liquid marking material and illustrating the cutting mechanism frame and elements of the distributing means in the active and in the inactive positions.
Figure 11:
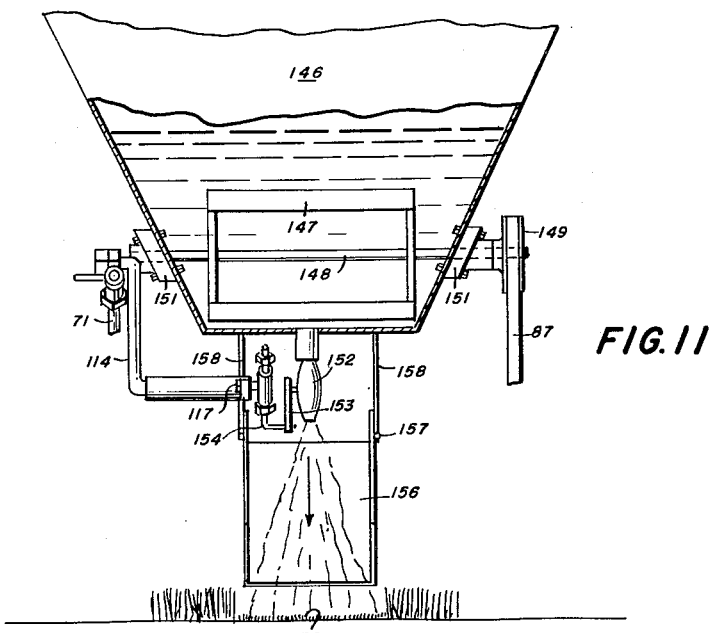
FIG. 11 is a rear elevational view of the modified hopper with portions shown in section and illustrating the modified means for discharging liquid marking material.

In operation of the machine when it is equipped with the liquid dispensing hopper the lowering of the cutter frame 36 to the active position causes the threaded rod 71 to be shifted forwardly to the full line position shown in FIG. 10. The spring 123 then shifts the idler arm 114 forwardly so that the arm 117 swings downwardly to the full line position of FIG. 10 lowering the chute 156 and moving the valve actuating lever 153 to a position opening the valve 152. Liquid thus escapes into the upper end of the chute 156 and spreads throughout the width thereof as determined by the side walls to apply the marking liquid to the strip 56. As the machine moves forwardly the pulley 149 is driven by the belt 87 to agitate the liquid and insure delivery through the valve 152. When the pedal 63 is released the spring means 61 lifts the cutter frame 36 to an inactive position and the arm 59 moves to the dotted line position shown in FIG. 10. The threaded rod 71 shifts the idler arm 114 to the dotted line position and the arm 117 lifts the chute 156 to immediately interrupt the discharge of liquid therefrom and the valve 152 is closed. In this modification the hook 127 may be engaged in the eyelet 128 to prevent the dispensing of liquid from the hopper 146 when it is desired to cut a strip in the turf without applying the marking fluid thereto.

While the invention has been described with reference to specific structural features and with reference to a particular vehicle it will be appreciated that various types of structures may be employed for supporting the cutting mechanism and the means for discharging the marking material. Changes may be made in the elements and the subcombinations as well as the overall assembly. Such alterations and others may be made without departing from the spirit and scope of the invention as set forth in the appended claims.

What we claim and desire to secure by Letters Patent is:

1. In a machine for marking a turf covered field, a frame, wheels supporting said frame for rolling movement over said field, a prime mover secured to said frame and having an output shaft, means for transmitting power from said output shaft to one of said wheels to propel the machine over the field, a seat supported on said frame, manually operated means for steering the machine by an individual seated on said seat, a cutter frame, a horizontally disposed cutter shaft journalled for rotation on said cutter frame, turf cutting elements carried by said cutter shaft, a pulley on said cutter shaft, pivots carried by said frame supporting said cutter frame for hinged movement about a horizontal axis intermediate the cutter shaft and the output shaft, a pulley on said output shaft; a belt trained about said pulleys tensioned when the cutter frame is hinged to a lowered active position and avoiding transmission of power from said output shaft to the cutter shaft when the cutter frame is hinged to a position above said active position, a first arm attached to and extending upwardly from said cutter frame, a spring secured to said first arm and to said frame having energy stored therein sufficient to swing the cutter frame to an inactive position above said lowered position, a second arm pivotally mounted on the frame, a rod connecting the upper ends of said arms, a pedal member connected to the second arm and supported on said frame in position to be actuated by the foot of an individual seated on said seat for moving said arms against the action of said spring whereby the cutter frame moves to the lowered active position, a second rod attached to the first arm, and an abutment member adjustable along the length of the second rod to engage the frame and limit downward swinging movement of the cutter frame.

2. In a machine for creating a marking line in a turf covered field, a frame, wheels supporting said frame for rolling movement over said field, a prime mover secured to said frame and having an output shaft, means for transmitting power from said output shaft to one of said wheels to propel the machine over the field, a seat supported on said frame, manually operated means for steering the machine by an individual seated on said seat, a cutter frame, a horizontally disposed cutter shaft journalled for rotation on said cutter frame, turf cutting elements carried by said cutter shaft, a pulley on said cutter shaft, pivots carried by said frame supporting said cutter frame for hinged movement about a horizontal axis, a pulley on said output shaft, a belt trained about said pulleys tensioned when the cutter frame is hinged to a lowered active position and avoiding transmission of power form said output shaft to the cutter shaft when the cutter frame is hinged to a position above said active position, an arm attached to and extending from said cutter frame, resilient means secured to said arm and to said frame having energy stored threin sufficient to swing the cutter frame to an inactive position above said lowered position, means connected to said arm including a pedal member supported for movement on the frame in position to be actuated by the foot of an individual seated on said seat for moving said arm against the action of said resilient means whereby the cutter frame moves to the lowered active position, and adjustable means limiting the downward movement of said cutter frame.

3. In a machine for forming a discernible line in the turf of a field, a chassis frame, wheels including a steerable wheel supporting said chassis frame for rolling movement over said field, a prime mover mounted on said chassis frame and having an output shaft, means for transmitting power from said output shaft to one of said wheels, vegetation cutting means supported for vertical movement relative to said chassis frame from an upper inactive position to a lower active position, means transmitting power from said output shaft to said cutting means only when it is in the active position, an arm pivotally mounted on said chassis frame for movement about a horizontal axis, said arm extending forwardly beyond said steering wheel, a laterally disposed member carried by said arm, feeler means carried by said laterally extending member, a bracket extending forwardly of the steering wheel swingable above a vertical axis during swinging of said steering wheel, and an inextensible flexible element connecting said bracket with the forward end of said arm for lifting the forward end thereof and said feeler means during swinging of the steering wheel.

References Cited in the file of this patent

UNITED STATES PATENTS

| | | |
|---|---|---|
| 1,421,373 | Bager | July 4, 1922 |
| 2,301,848 | Beaman | Nov. 10, 1942 |
| 2,345,653 | Blumberg | Apr. 4, 1944 |
| 2,478,587 | LaBonte | Aug. 9, 1949 |
| 2,509,343 | Henderson | May 30, 1950 |
| 2,521,033 | Bell | Sept. 5, 1950 |
| 2,589,845 | Mott | Mar. 18, 1952 |
| 2,639,571 | Kelly | May 26, 1953 |
| 2,640,309 | Benson | June 2, 1953 |
| 2,673,725 | Coates | Mar. 30, 1954 |
| 2,792,898 | Mast | May 21, 1957 |
| 2,828,599 | Haynes | Apr. 1, 1958 |
| 3,019,585 | Wellborn | Feb. 6, 1962 |